United States Patent [19]
Lai

[11] Patent Number: 5,996,509
[45] Date of Patent: Dec. 7, 1999

[54] PALLET

[76] Inventor: Chein-Tsai Lai, No. 9, Nan-Ho Countryside, Shui-Shang Hsiang, Chia I, Taiwan

[21] Appl. No.: 09/034,244

[22] Filed: Mar. 4, 1998

[51] Int. Cl.[6] .................................................... B65D 19/00
[52] U.S. Cl. .......................................................... 108/51.3
[58] Field of Search ................................. 108/51.11, 51.3

[56] References Cited

U.S. PATENT DOCUMENTS

| | | | |
|---|---|---|---|
| 5,327,839 | 7/1994 | Herring et al. | 108/51.3 |
| 5,370,062 | 12/1994 | Johnston et al. | 108/51.3 |
| 5,411,786 | 5/1995 | Kuo | 428/184 X |
| 5,483,875 | 1/1996 | Turecek et al. | 108/51.3 |
| 5,493,962 | 2/1996 | McCarthy | 108/51.3 |
| 5,568,774 | 10/1996 | Hutchison | 108/51.3 |
| 5,595,125 | 1/1997 | Bridges, Jr. | 108/51.3 |

*Primary Examiner*—Eileen Dunn Lillis
*Assistant Examiner*—Brian H. Buck
*Attorney, Agent, or Firm*—Rosenberg, Klein & Lee

[57] ABSTRACT

The present invention relates to a pallet which generally comprises a bottom deckboard, a stringer layer, a covering board, and a top deckboard. The bottom deckboard is provided with a folding flap at each side which is provided with several stringer openings that are spaced from each other. The top surface of the bottom deckboard is disposed with a planar reinforced board. The stringer layer can be attached to the top surface of the planar reinforced board by means of starch glue that is harmless to the environment. The stringer layer is configured by several individual stringer units that are disposed in parallel and spaced from the other. Each of the stringer units is spaced with a space that equals and aligns to the opening of the folding flap of the bottom deckboard. Each of the stringer units is provided with a cutout at the side that serves as an introducing hole for supporting paperboard. At least a covering board 3 is attached to the top surface of the stringer unit 21 with its bottom surface. The covering board includes a covering sheet and a reinforced board. The covering sheet can be made from erected corrugated paperboard. The top surface of the covering board is attached to the bottom surface of the top deckboard. The top deckboard includes a folding flap at both sides. Each of the folding flaps is provided with several openings that are aligned to the cutouts of the stringer unit. The loading capability of the pallet made thereof is excellent and is harmless to the environment as it is recyclable. The overall economic profit may thus be increased.

4 Claims, 9 Drawing Sheets

PALLET

FIELD OF THE INVENTION

The present invention relates to a pallet, more particularly, to an improved pallet that is made from paperboard that can be recycled and economic profit can be also increased.

DESCRIPTION OF PRIOR ART

Figure 1:
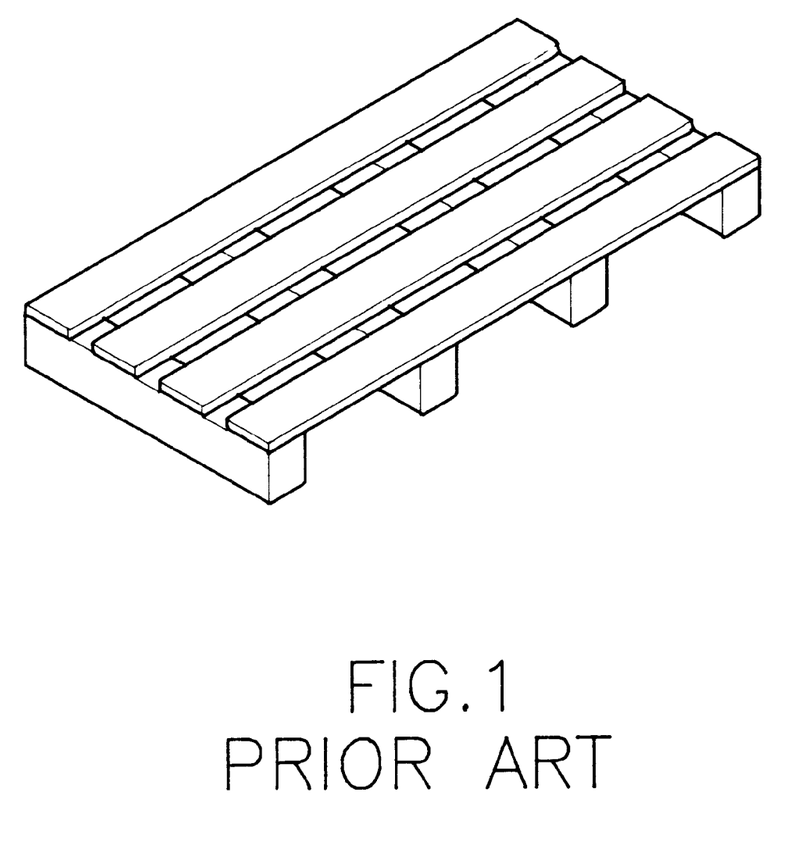
FIG. 1 is a perspective view of the conventional wooden pallet.
Figure 2:
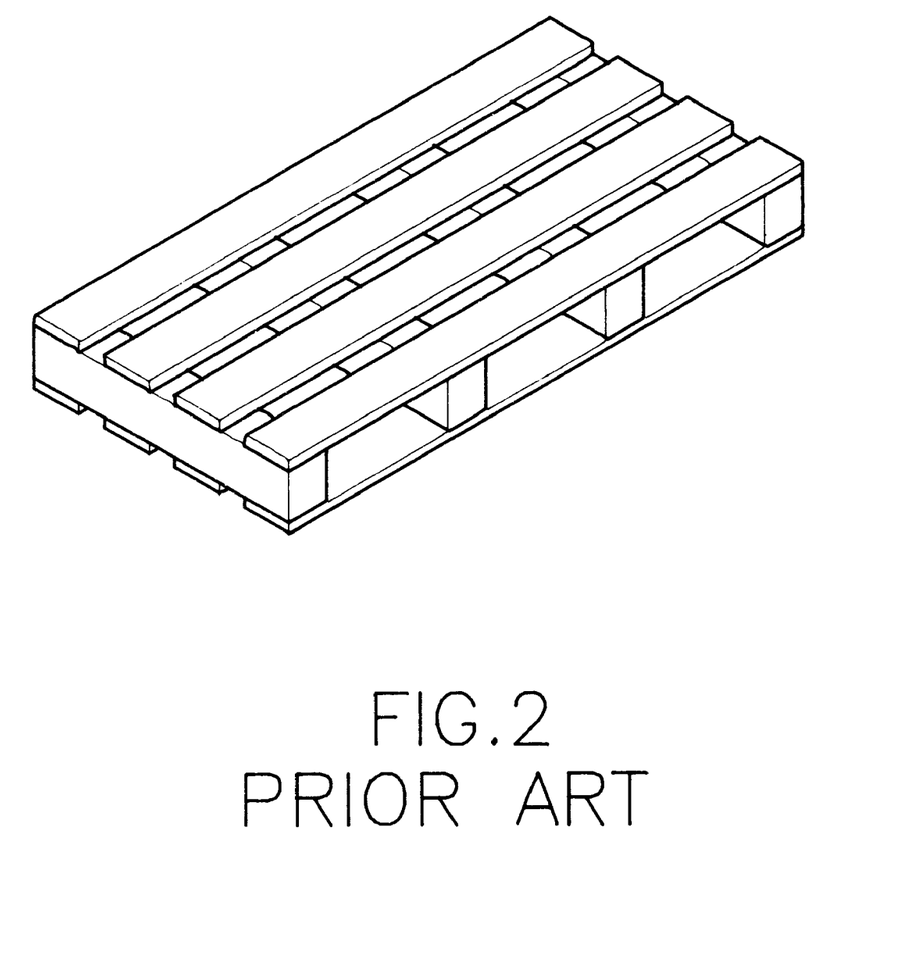
FIG. 2 is still a perspective view of another conventional wooden pallet.

As shown in FIGS. 1 and 2, the conventional pallet is generally made from wooden plate that is tough and can resist a heavy load as well as impact. However, it is difficult to recycle for further usage. Once the wooden pallet is discarded, it may cause a risk to the environment. Besides, the wooden pallet has poor economic profit.

SUMMARY OF THE INVENTION

It is the objective of this invention to provide an improved pallet that is configured by a bottom deckboard, a reinforced board, a stringer, a covering board, and a deckboard. Since at least one covering board can be disposed between the stringer and the top deckboard, the overall rigidity and loading capability can be increased. The improved pallet can be readily used to replace the conventional wooden pallet.

According to one aspect of the present invention, the configuring boards are made from paperboard that can be recycled for further usage. Not only will it be less harmful to the environment, but will also increase the economic profit as compared with the conventional wooden pallet.

According to one aspect of the present invention, the outer surface of the pallet can be coated with an impermeable film in a manner such that the pallet made according to the present invention is waterproof.

BRIEF DESCRIPTION OF THE DRAWINGS

In order that the present invention may be more readily understood, the following description is given, merely by way of example with reference to the accompanying drawings, in which.

DETAILED DESCRIPTION OF PREFERRED EMBODIMENT

Figure 3:
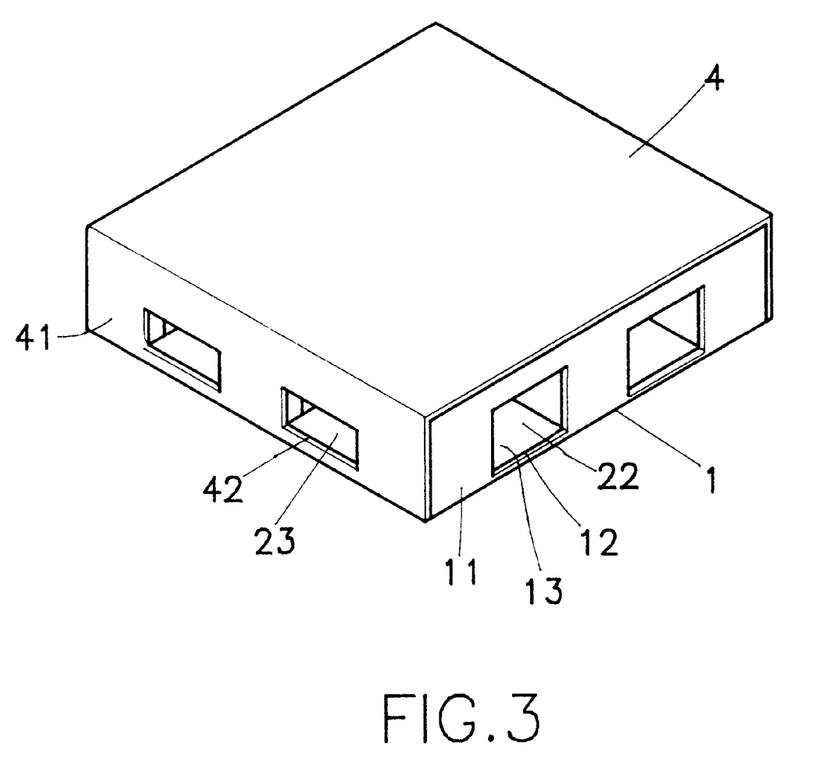
FIG. 3 is a perspective view of the pallet made according to the present invention.
Figure 4:
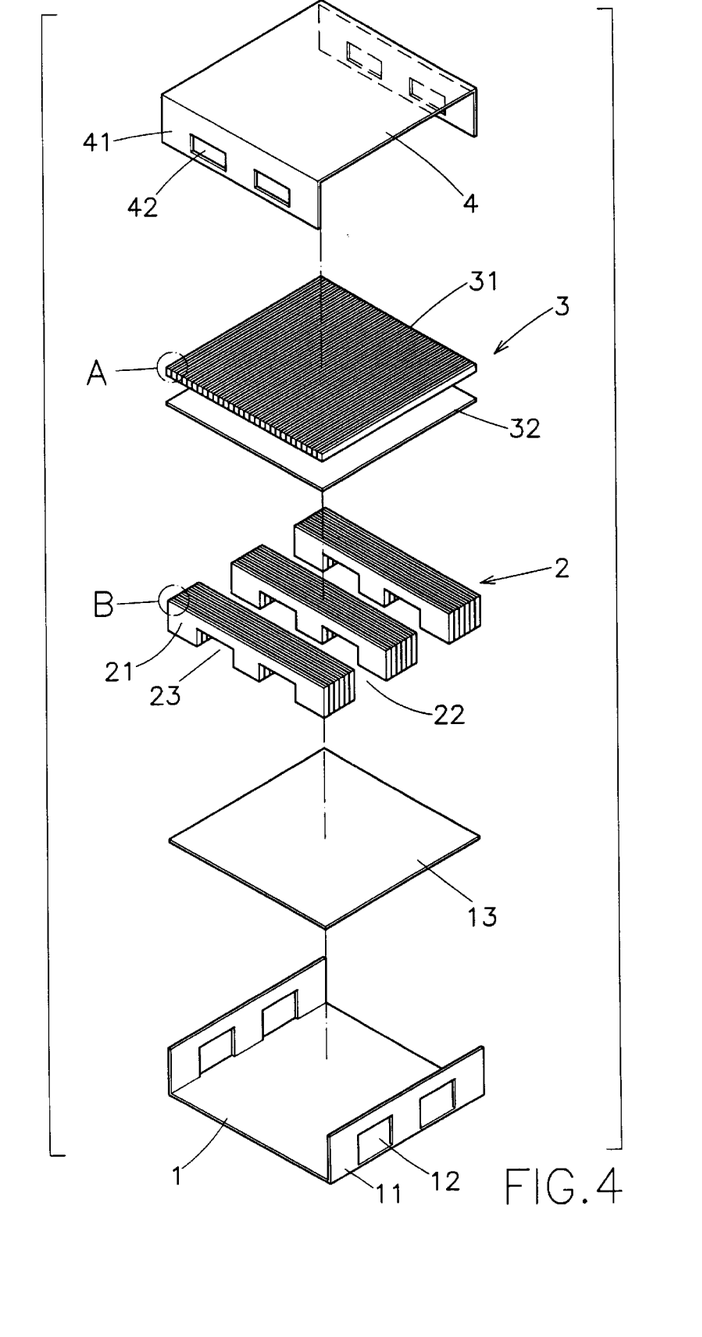
FIG. 4 is an exploded view of the pallet made according to the present invention.
Figure 4A:
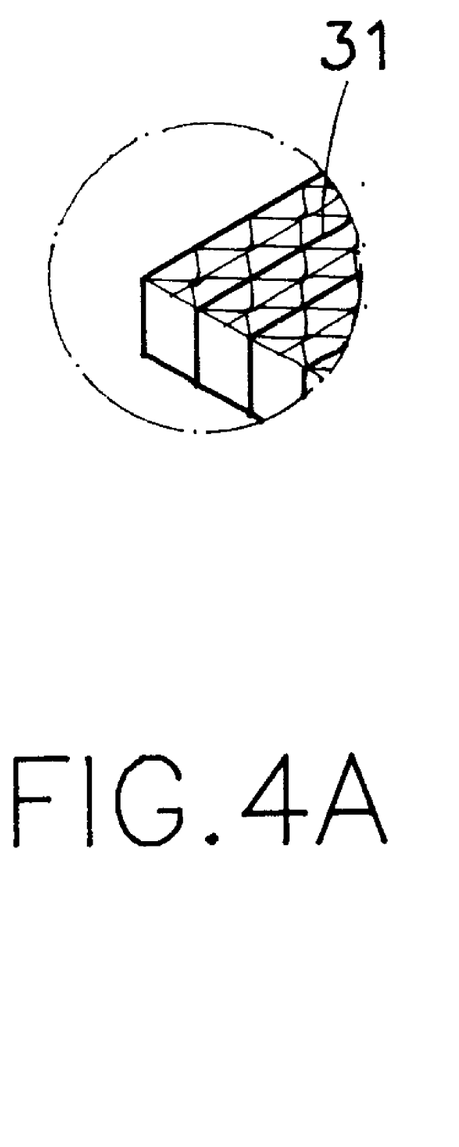
FIG. 4A is a detailed view of a portion of the pallet shown in FIG. 4.
Figure 4B:
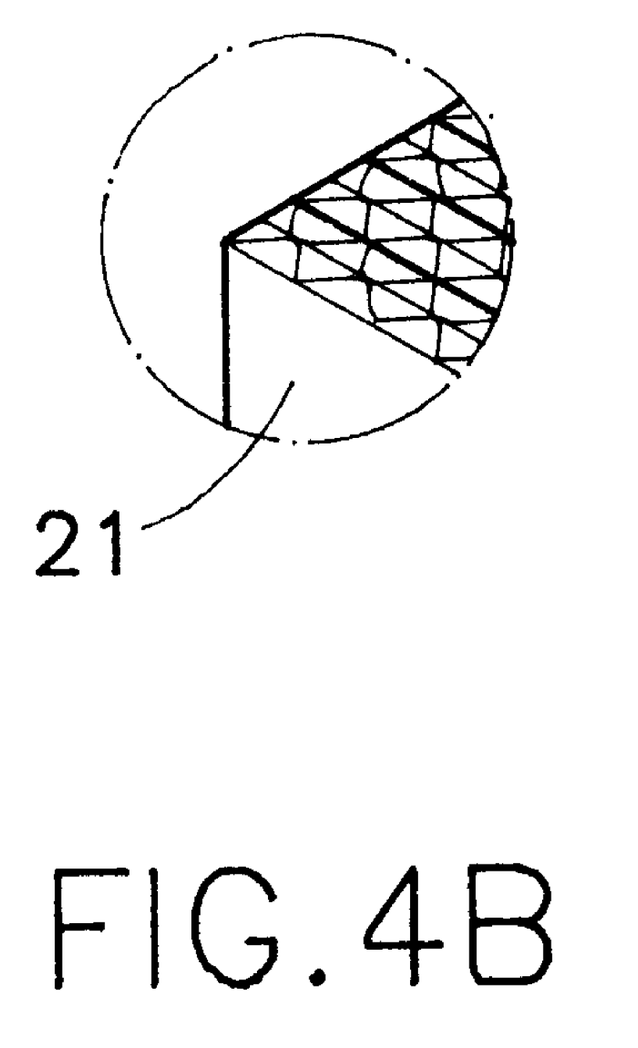
FIG. 4B is a detailed view of another portion of the pallet shown in FIG. 4.
Figure 5:
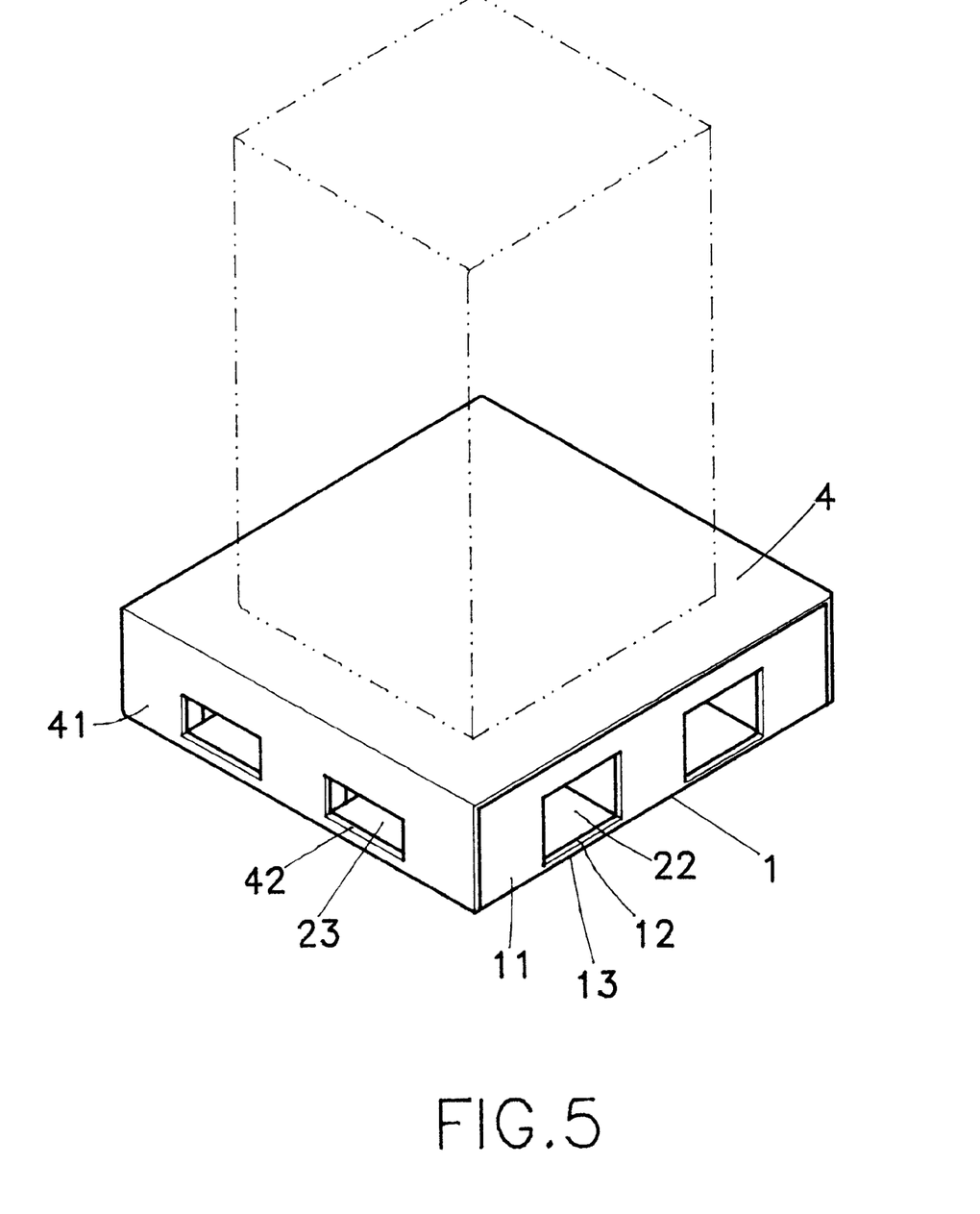
FIG. 5 is a schematic illustration of the pallet made according to the present invention.

Referring to FIGS. 3 to 5, the improved pallet made according to the present invention generally comprises a bottom deckboard 1, a stringer layer 2, a covering board 3, and a top deckboard 4.

The bottom deckboard 1 is configured by a plurality of paperboards or corrugated paperboards that are overlapped with each other. The bottom deckboard 1 is provided with a folding flap 11 at each side and each of the folding flaps 11 is provided with several stringer openings 12 that are spaced from each other. The top surface of the bottom deckboard 1 is disposed with a planar reinforced board 13. The bottom surface of the bottom deckboard 1 is coated with an impermeable film, such as a polyethylene (PE) film, to waterproof resistance.

The stringer layer 2 can be attached to the top surface of the planar reinforced board 13 by means of starch glue that is harmless to the environment. The stringer layer 2 is configured by a plurality of individual stringer units 21 that are spaced and parallel with each other. In this embodiment, three stringer units 21 are disposed. Each of the stringer units 21 is configured by several layers of erected corrugated paperboards that are glued together. The loading capability of the stringer unit 21 depends on the number of corrugated paperboard. The more the corrugated paperboard, the stronger or larger the loading capability. Each of the stringer units 21 is spaced with a space 22 that equals and aligns to the opening 12 of the folding flap 11. Each of the stringer units 21 is provided with cutouts 23 along a periphery which serve to define spaces through which a pallet lifting member may pass.

The covering board 3 can be attached to the top surface of the stringer unit 21 with its bottom surface. The covering board 3 includes a covering sheet 31 and a reinforced board 32. The covering sheet 31 can be made from erected corrugated paperboard, while the reinforced board 32 is formed by several paperboards.

The top deckboard 4 includes a folding flap 41 at both sides and the top deckboard 4 is offset from the bottom deckboard 1 about 90 degrees. Each of the folding flaps 41 is provided with several openings 42 that are aligned to the cutouts 23 of the stringer unit 21. The top surface of the top deckboard 4 is also coated with an impermeable film, for example PE film.

With those configuring elements, the paper pallet made according to the present invention can be readily manufactured. The pallet made according to the present invention has an excellent loading capability at any point.

Figure 6:
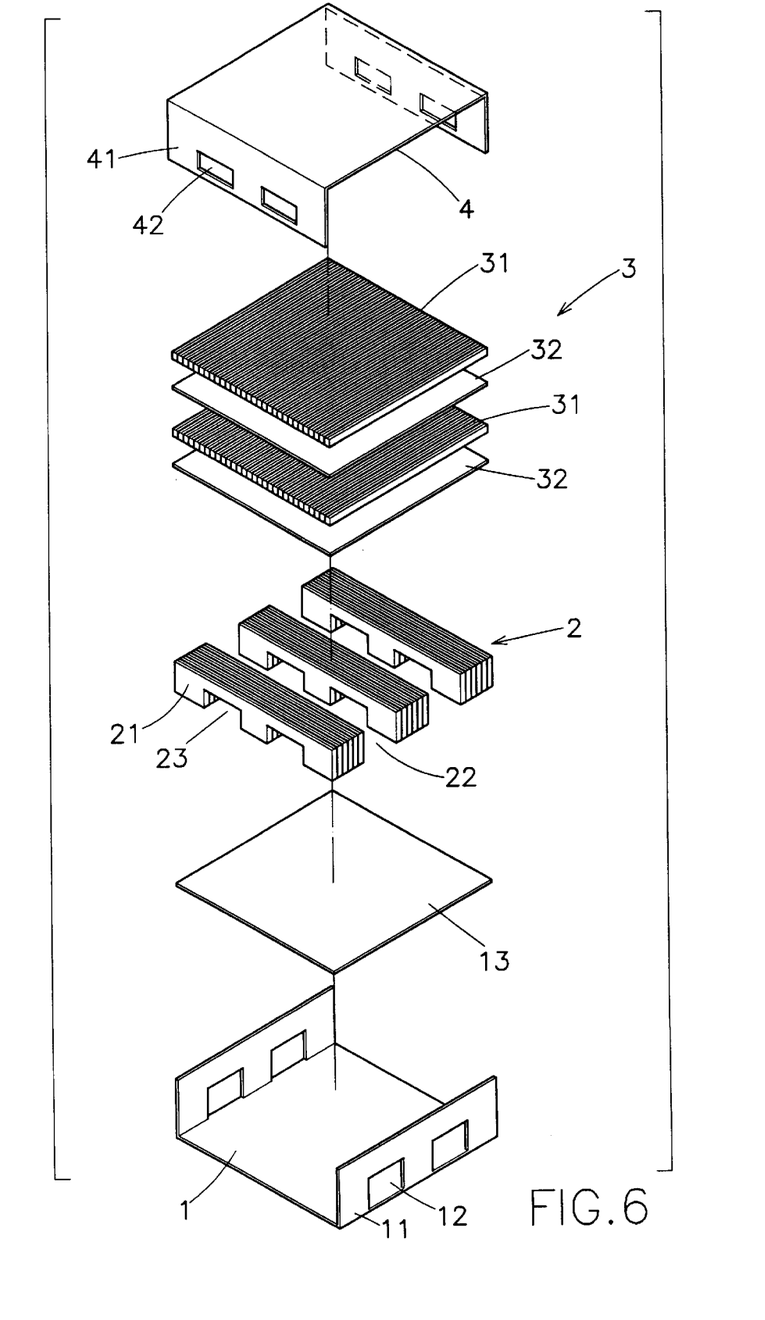
FIG. 6 is an exploded view of the second embodiment of the pallet made according to the present invention.
Figure 7:
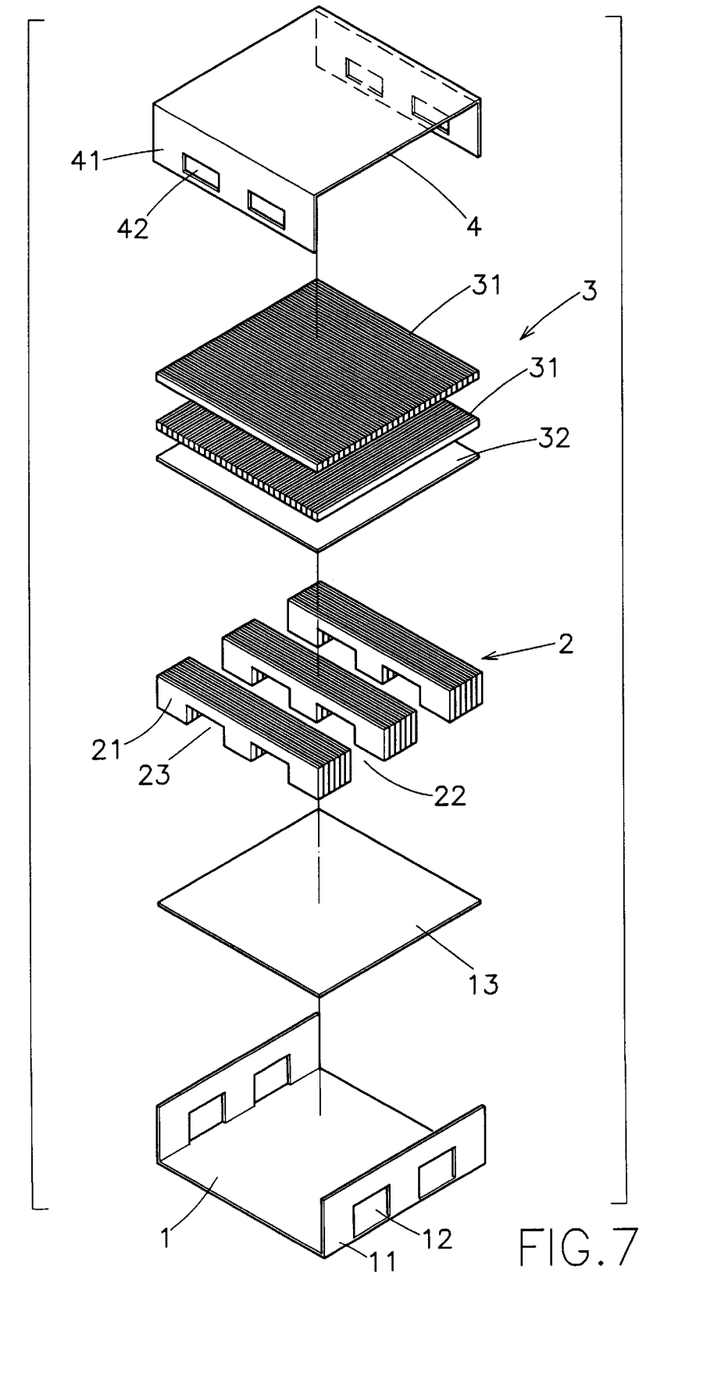
FIG. 7 is still an exploded view of the third embodiment of the pallet made according to the present invention.

In order to facilitate a fast and efficient production, the covering sheet 31 and the reinforced board 32 may have same thickness or height. If the loading capability of the pallet is to increase, at least two layers of covering board 3 can be disposed of between the stringer layer 2 and the top deckboard 4, as shown in FIG. 6; or a second covering sheet 31' can be disposed onto the first covering sheet 31 in a manner such that those two covering sheets 31, 31' are offset from 90 degrees, as shown in FIG. 7.

As all the configuring elements of the pallet are made from paperboards that are recycled, not only will it increase the throughput of the pallet, but also make the pallet recyclable. It is environmental friendly and the economic profit is increased.

While the particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A pallet assembly formed of a paper material comprising:

(a) a bottom deckboard having a substantially planar bottom panel defined by at least a pair of opposed longitudinal edges and a pair of opposed lateral edges, said bottom deckboard having at least a pair of bottom folding flaps extending upward respectively from said longitudinal edges, each said bottom folding flap having formed therein a plurality of spaced openings each adapted for receiving a pallet lifting member therethrough, at least a pair of said openings of one said bottom folding flap being substantially aligned with a pair of said openings of the other said bottom folding flap, said bottom panel having a bottom surface coated with a liquid-impermeable film;

(b) a substantially planar bottom reinforcing board coupled to said bottom panel of said bottom deckboard;

(c) a top deckboard having a substantially planar top panel defined by at least a pair of opposed longitudinal edges and a pair of opposed lateral edges, said top deckboard having at least a pair of top folding flaps extending downward respectively from said lateral edges, each said top folding flap having formed therein a plurality of spaced openings each adapted for receiving a pallet lifting member therethrough, at least a pair of said openings of one said top folding flap being substantially aligned with a pair of said openings of the other said top folding flap, said top panel having a top surface coated with a liquid-impermeable film;

(d) a substantially planar covering board coupled to said top panel of said top deckboard, said covering board including a covering sheet coupled to a top reinforcing board, said covering sheet having a plurality of corrugations formed thereon to extend in a first direction; and, (e) a plurality of spaced stringer units sandwiched between said covering board and said bottom reinforcing board, said spaced stringer units extending substantially in parallel in a second direction transversely oriented with respect to said first direction, one of said first and second directions being substantially parallel to a longitudinal direction, each said stringer unit including a plurality of stringer layers laminated one to the other, each said stringer unit having defined along a periphery thereof a plurality of spaced cutouts adapted to engage a pallet lifting member, each said stringer unit having at least a pair of said cutouts aligned respectively in said first direction with a pair of said cutouts of each of the other said stringer units;

whereby said pallet assembly is adapted for displacement by a pallet lifting member passed in one of said first and second directions therethrough.

2. The pallet assembly as recited in claim 1 wherein said bottom deckboard includes a plurality of paper panels overlapped with each other.

3. The pallet assembly as recited in claim 2 wherein a plurality of said paper panels of said bottom deckboard are corrugated.

4. The pallet assembly as recited in claim 1 wherein said covering board includes at least a second of said covering sheets, said corrugations of said second covering sheet extending in said second direction.

* * * * *